(12) United States Patent
Xue et al.

(10) Patent No.: US 11,899,929 B2
(45) Date of Patent: Feb. 13, 2024

(54) METHOD FOR CUSTOMIZING KEY OF FOLDABLE DEVICE, DEVICE, AND STORAGE MEDIUM

(71) Applicant: HUAWEI TECHNOLOGIES CO., LTD., Guangdong (CN)

(72) Inventors: Qingfeng Xue, Xi'an (CN); Jiachen Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 17/785,558

(22) PCT Filed: Dec. 2, 2020

(86) PCT No.: PCT/CN2020/133284
§ 371 (c)(1),
(2) Date: Jun. 15, 2022

(87) PCT Pub. No.: WO2021/121036
PCT Pub. Date: Jun. 24, 2021

(65) Prior Publication Data
US 2023/0010492 A1   Jan. 12, 2023

(30) Foreign Application Priority Data
Dec. 16, 2019 (CN) .......................... 201911295379.2

(51) Int. Cl.
*G06F 3/041* (2006.01)
*G06F 3/04886* (2022.01)
(Continued)

(52) U.S. Cl.
CPC ........ *G06F 3/04886* (2013.01); *G06F 1/1652* (2013.01); *G06F 3/0484* (2013.01)

(58) Field of Classification Search
CPC ................ G06F 1/1652; G06F 1/1677; G06F 2203/04102; G06F 3/0484; G06F 3/04886
See application file for complete search history.

(56) References Cited

U.S. PATENT DOCUMENTS

| | | | |
|---|---|---|---|
| 2009/0219247 A1* | 9/2009 | Watanabe | G06F 3/0485 345/157 |
| 2014/0028597 A1* | 1/2014 | Cho | G06F 3/04842 345/173 |

(Continued)

FOREIGN PATENT DOCUMENTS

| | | |
|---|---|---|
| CN | 102263839 A | 11/2011 |
| CN | 107656578 A | 2/2018 |

(Continued)

OTHER PUBLICATIONS

Extended European Search Report issued in EP20903000.6, dated Jan. 9, 2023, 7 pages.

(Continued)

*Primary Examiner* — Insa Sadio

(57) ABSTRACT

A method for customizing a key of a foldable device, a device, and a storage medium are provided. When the foldable device is in a folded state, a touchscreen of the foldable device is divided into three regions: a primary screen, a back screen, and a secondary screen. According to the method for customizing a key, the foldable device receives a first user operation used to indicate the foldable device to add a custom key on the back screen or the secondary screen, and then obtains a physical state of the foldable device. If the foldable device is in a folded state, the custom key is added on the back screen or the secondary screen based on the first user operation.

18 Claims, 11 Drawing Sheets

(51) Int. Cl.
    *G06F 1/16*      (2006.01)
    *G06F 3/0484*   (2022.01)

(56) References Cited

U.S. PATENT DOCUMENTS

| | | |
|---|---|---|
| 2014/0198036 A1 | 7/2014 | Kim et al. |
| 2016/0026381 A1 | 1/2016 | Kim et al. |
| 2016/0187994 A1 | 6/2016 | La et al. |
| 2016/0202905 A1 | 7/2016 | Joo |
| 2017/0221456 A1 | 8/2017 | Kim et al. |
| 2018/0067824 A1 | 3/2018 | Conti et al. |
| 2018/0253266 A1 | 9/2018 | Tamura |
| 2019/0272137 A1 | 9/2019 | An et al. |

FOREIGN PATENT DOCUMENTS

| | | |
|---|---|---|
| CN | 107659837 A | 2/2018 |
| CN | 107992302 A | 5/2018 |
| CN | 108037887 A | 5/2018 |
| CN | 108043020 A | 5/2018 |
| CN | 108926840 A | 12/2018 |
| CN | 109613958 A | 4/2019 |
| CN | 109683761 A | 4/2019 |
| CN | 109981839 A | 7/2019 |
| CN | 110162372 A | 8/2019 |
| CN | 111142767 A | 5/2020 |
| WO | 2016173158 A1 | 11/2016 |
| WO | 2018017044 A1 | 1/2018 |

OTHER PUBLICATIONS

Office Action issued in CN201911295379.2, dated Nov. 3, 2020, 7 pages.

International Search Report and Written Opinion issued in PCT/CN2020/133284, dated Mar. 3, 2021, 12 pages.

* cited by examiner

METHOD FOR CUSTOMIZING KEY OF FOLDABLE DEVICE, DEVICE, AND STORAGE MEDIUM

This application is a National Stage of International Application No. PCT/CN2020/133284 filed on Dec. 2, 2020, which claims priority to Chinese Patent Application No. 201911295379.2, filed on Dec. 16, 2019, both of which are hereby incorporated by reference in their entireties.

TECHNICAL FIELD

This application relates to the field of terminal devices, and in particular, to a method for customizing a key of a foldable device, a device, and a storage medium.

BACKGROUND

With development of a terminal device technology, there are increasingly more occasions for users to apply terminal devices in their life. For example, a user may use terminal devices such as mobile phones to obtain information and play games. When using the mobile phones to play games, the users mainly use thumbs of both hands to perform control. However, as increasingly more keys are provided in mobile games, and operations become increasingly complicated, challenges are brought to user operations.

To facilitate user operations, a solution of assisting operations by using a physical structure is provided in a conventional technology. FIG. 1 is a schematic diagram of assisting operations of a terminal device by using a physical structure. As shown in FIG. 1, a user may install a physical structure outside the terminal device and operate at a specific position of a screen by using the physical structure. For example, the user may perform a tap operation at a specific position of the screen of the terminal device by performing an operation such as pressing on a top or a back of the physical structure.

However, an installation position of the physical structure is limited, which cannot well cooperate with usage habits of the user.

SUMMARY

Embodiments of this application provide a method for customizing a key of a foldable device, a device, and a storage medium, which are used to resolve a problem in a conventional technology that an installation position of a physical structure is limited, which cannot well cooperate with usage habits of a user, and improve operating experience of the user.

According to a first aspect, this application provides a method for customizing a key of a foldable device, where when the foldable device is in a folded state, a touchscreen of the foldable device is divided into three regions: a primary screen, a back screen, and a secondary screen. The foldable device receives a first user operation used to indicate the foldable device to add a custom key on the back screen or the secondary screen, and then obtains its own physical state. The physical state includes a folded state or an unfolded state. If the foldable device is in the folded state, the custom key is added on the back screen or the secondary screen based on the first user operation.

It should be understood that in the foldable device, a foldable screen refers to a touchscreen that can be folded, and the touchscreen includes a display screen and a touch sensor arranged on the display screen. In a specific implementation of the solution, the touchscreen that can be folded includes a case in which the touchscreen itself can be bent, further includes a case in which the touchscreen itself cannot be bent but joints of a plurality of screens can be bent, and further includes another possible solution which enables a screen to be folded. This is not limited in example embodiments of the present disclosure.

In the foregoing solution, the custom key added on the back screen or the secondary screen of the foldable device can simulate an operation on the primary screen during use of the foldable device, and can better cooperate with usage habits of the user and resolve a problem of screen blocking when the primary screen is operated.

In a specific implementation of the first aspect, adding the custom key on the back screen or the secondary screen may be implemented as follows:

The foldable device receives a second user operation acting at a first position on the back screen or the secondary screen, and adds a custom key at the first position in response to the second user operation. It should be understood that the first position herein may be a point or may be a region on the back screen or the secondary screen.

The foldable device receives a second touch operation performed on the primary screen by the user, and establishes a mapping relationship between a first touch operation on the custom key and a second touch event corresponding to the second touch operation based on the second touch operation.

In the foregoing solution, by using a position selected by the user on the back screen or the secondary screen, the foldable device adds the custom key and establishes a mapping relationship between a touch operation of the custom key and a touch event corresponding to a touch operation on the primary screen, to implement simulation of an operation on the primary screen by using the custom key on the secondary screen or the back screen.

In another implementation of the first aspect, adding the custom key at the first position in response to the second user operation may be implemented as follows:

In response to the second user operation, the foldable device displays a preview key at the first position on the back screen or the secondary screen, so that the user can determine attributes such as a position, a size, and a shape of the custom key based on the preview key.

After receiving a confirmation operation performed by the user, the foldable device saves the attributes of the custom key in response to the confirmation operation.

In this solution, by displaying the preview key, the foldable device facilitates confirmation of the attributes of the custom key by the user, so that the user can add the custom key that best meets a requirement and operating habits on the foldable device, thereby improving user experience.

In another implementation of the first aspect, before the confirmation operation performed by the user is received, the method further includes: The foldable device receives a third user operation performed on the preview key by the user, and changes the attributes of the custom key based on the third user operation.

In this solution, on the basis of the foregoing solution, the user can set, based on a requirement of the user, the attributes of the custom key to be added, so that the custom key can better match operating habits of the user.

In combination with any one of the foregoing solutions, in another implementation of the first aspect, a process of using the custom key added on the back screen or the secondary screen of the foldable device is:

when the foldable device is in the folded state, receiving the first touch operation on the custom key performed on the back screen or the secondary screen by the user; and then obtaining the second touch event corresponding to the first touch operation, and executing the second touch event.

In this solution, when the foldable device is used in the folded state, the user can perform a touch operation on the custom key on the back screen or the secondary screen of the foldable device. The foldable device obtains a touch event on the primary screen corresponding to the touch operation and executes the event, to implement simulation of an operation on the primary screen by using the custom key, and avoid blocking the primary screen when an operation is performed on the primary screen, thereby improving user experience.

Optionally, in an implementation of the first aspect, before receiving the second touch operation performed by the user on the primary screen, the foldable device receives a start instruction for instructing the foldable device to start to obtain touch operations on the primary screen. The foldable device starts to obtain the touch operations on the primary screen based on the start instruction, and stops obtaining the touch operations on the primary screen when receiving an end instruction for instructing the foldable device to end obtaining the touch operations on the primary screen.

In this solution, the start instruction and the end instruction are generated by operating the foldable device. The foldable device starts to obtain the touch operations on the primary screen based on triggering of the start instruction, and ends obtaining the touch operations on the primary screen based on triggering of the end instruction. Simulation of a plurality of touch operations on the primary screen by using the custom key can be implemented in this manner, and settings are simple and can effectively improve user experience.

Further, in another implementation of the first aspect, before the obtaining the second touch event corresponding to the first touch operation, and executing the second touch event, the method further includes:

The foldable device may obtain the attributes of the custom key, and display the custom key on the back screen or the secondary screen based on the attributes.

In this solution, during application of the foldable device, the custom key added by the user may be further displayed on the back screen or the secondary screen, so that the user can determine a position of the touch operation, thereby improving user experience.

Further, in still another implementation of the first aspect, before the receiving the first touch operation performed by the user on the custom key on the back screen or the secondary screen, the method further includes:

The foldable device determines the primary screen, the back screen, and the secondary screen of the foldable device.

In this solution, when the foldable device is in the folded state, the primary screen, the back screen, and the secondary screen need to be determined first, so that an operation on the primary screen can be simulated subsequently by using the custom key on the back screen or the secondary screen.

According to a second aspect, this application provides a foldable device, where when the foldable device is in a folded state, a touchscreen of the foldable device is divided into three regions: a primary screen, a back screen, and a secondary screen, and the foldable device includes:

an obtaining module, configured to receive a first user operation, where the first user operation is used to indicate the foldable device to add a custom key on the back screen or the secondary screen; and a processing module, configured to obtain a physical state of the foldable device, where the physical state includes a folded state or an unfolded state, where if the foldable device is in the folded state, the processing module is further configured to add the custom key on the back screen or the secondary screen based on the first user operation.

Optionally, the processing module is further configured to:
receive a second user operation, where the second user operation is performed at a first position on the back screen or the secondary screen;
add the custom key at the first position in response to the second user operation;
receive a second touch operation performed by a user on the primary screen; and
establish a mapping relationship between a first touch operation on the custom key and a second touch event corresponding to the second touch operation based on the second touch operation.

Optionally, the processing module is further configured to:
display a preview key at the first position on the back screen or the secondary screen in response to the second user operation;
receive a confirmation operation performed by the user, and
save attributes of the custom key in response to the confirmation operation.

Optionally, the obtaining module is further configured to receive a third user operation performed on the preview key by the user, and the processing module is further configured to change the attributes of the custom key based on the third user operation.

Optionally, the obtaining module is further configured to: when the foldable device is in the folded state, receive the first touch operation performed on the custom key on the back screen or the secondary screen by the user; and the processing module is further configured to obtain the second touch event corresponding to the first touch operation, and execute the second touch event.

Optionally, the foldable device further includes a display module;

the processing module is further configured to obtain the attributes of the custom key; and the display module is configured to display the custom key on the back screen or the secondary screen based on the attributes.

Optionally, the processing module is further configured to:
determine the primary screen, the back screen, and the secondary screen of the foldable device.

According to a third aspect, this application provides a foldable device, including: a processor, a memory, and a foldable screen, where the memory is configured to store a computer program; and the processor is configured to execute the computer program stored in the memory, so that the foldable device performs the method for customizing a key of a foldable device according to any one of the implementations of the first aspect.

According to a fourth aspect, this application provides a computer-readable storage medium, where a program or instructions is/are stored in the computer-readable storage medium, and when the program or the instructions is/are run on a computer, the method for customizing a key of a foldable device according to any one of the implementations of the first aspect is performed.

Understandably, the foldable device according to the second aspect, the foldable device according to the third aspect, and the computer-readable storage medium according to the fourth aspect are all used to perform the foregoing method for customizing a key of a foldable device, so that for beneficial effects that can be achieved thereby, refer to the beneficial effects of the foregoing corresponding methods. Details are not described herein again.

DESCRIPTION OF EMBODIMENTS

Figure 1:
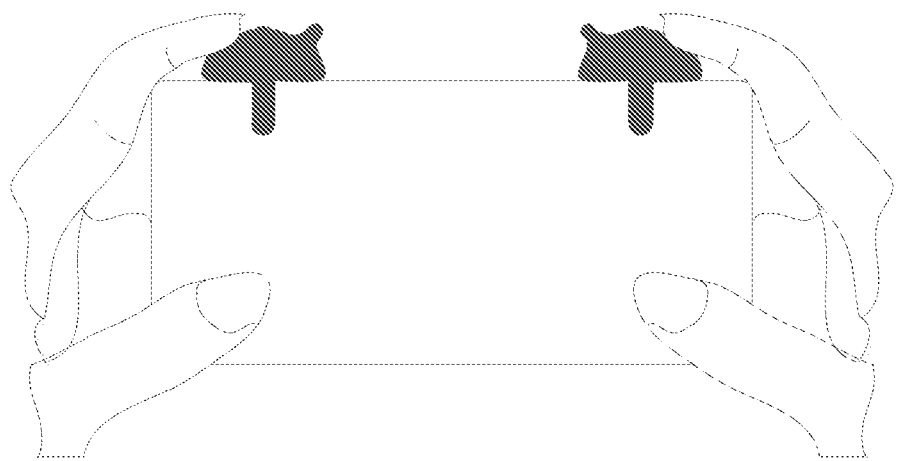
FIG. 1 is a schematic diagram of assisting an operation of a terminal device by using a physical structure.
Figure 2:
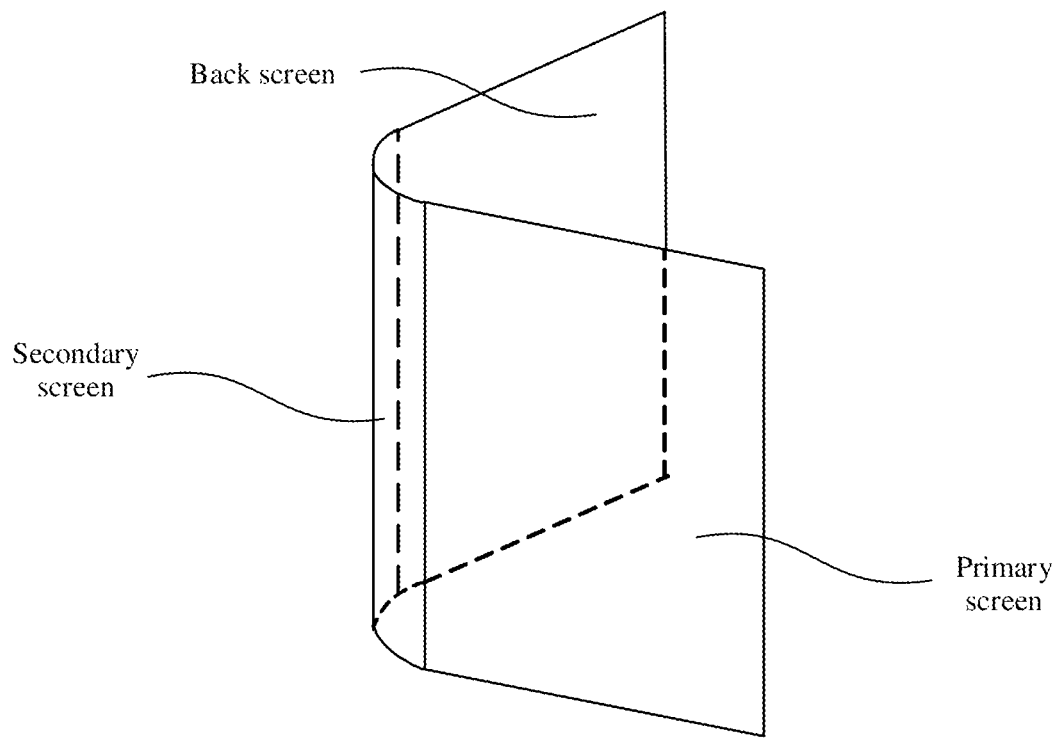
FIG. 2 is a schematic diagram of a foldable device shown in an embodiment of this application.

With development of terminal devices, terminal devices with foldable screens (referred to as foldable devices below) emerge accordingly. It should be understood that, a foldable screen refers to a touchscreen that can be folded, and the touchscreen includes a display screen and a touch sensor arranged on the display screen. In a specific implementation of the solution, the touchscreen that can be folded includes a case in which the touchscreen itself can be bent, further includes a case in which the touchscreen itself cannot be bent but joints of a plurality of screens can be bent, and may further include another possible solution which enables a screen to be folded. This is not limited in embodiments of this application. FIG. 2 is a schematic diagram of a foldable device shown in an embodiment of this application. As shown in FIG. 2, when the foldable device is in a folded state, the foldable device includes: a touchscreen (referred to as a primary screen below) (facing a user) on the front of the foldable device, a touchscreen (referred to as a back screen below) (facing away from the user) on the back of the foldable device, and a touchscreen (referred to as a secondary screen below) on a side face of the foldable device. Based on this, in view of the technical problems existing in a conventional technology, this application provides a method for customizing a key of a foldable device, in which the touchscreens located on the back and/or the side face of the foldable device are used, and touch of the user on the back screen or a side screen is mapped to touch of the user at a specific position of the primary screen, thereby expanding a region controllable by the user and simplifying operations of the user.

The foldable device may include a mobile phone with a foldable screen, a tablet computer, a notebook computer, an ultra-mobile personal computer (UMPC), a handheld computer, a netbook, a personal digital assistant (PDA), a wearable device, a virtual reality device, and the like. This is not limited in embodiments of this application.

In addition, the primary screen, the secondary screen, and the back screen may be three independent touchscreens, or may be three regions of one touchscreen, and areas of the three regions may be the same or different. For example, as shown in FIG. 2, the user may fold the touchscreen along one or more folding lines in the screen. In this case, the touchscreen is divided into the primary screen, the secondary screen, and the back screen with the folding line as a boundary. It should be understood that the folding line mentioned herein is only for ease of understanding, and the folding line may alternatively be a folding belt, or the like. This is not limited herein. In FIG. 2, folding the touchscreen along the fixed folding line is taken as an example for description, but the method described herein is not limited thereto.

Figure 3:
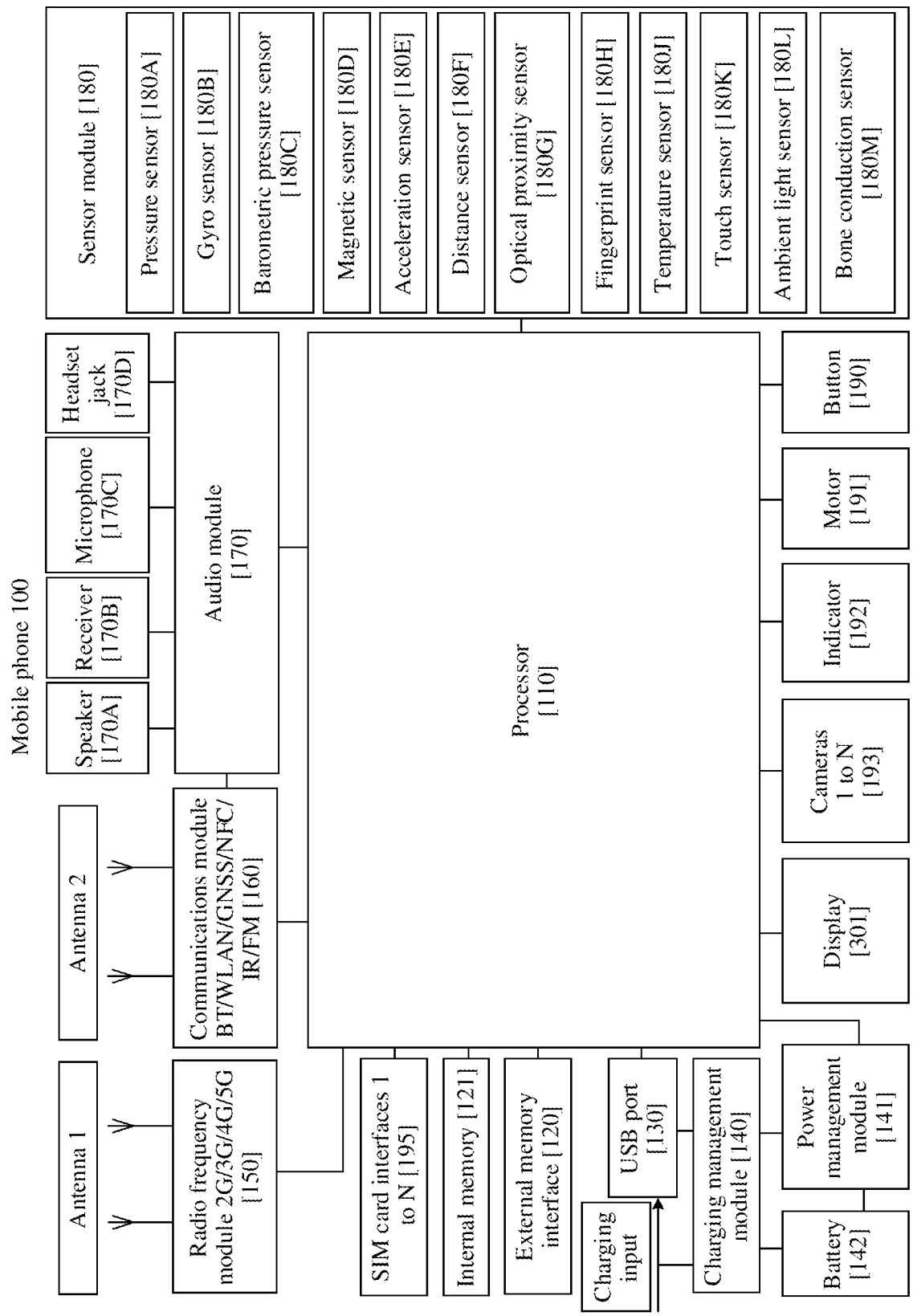
FIG. 3 is a schematic diagram of a structure of a non-limiting example mobile phone.

Taking a mobile phone 100 as an example of the foregoing foldable device, FIG. 3 is a schematic diagram of a structure of a mobile phone.

The mobile phone 100 may include a processor 110, an external memory interface 120, an internal memory 121, a universal serial bus (USB) port 130, a charging management module 140, a power management module 141, a battery 142, an antenna 1, an antenna 2, a radio frequency module 150, a communications module 160, an audio module 170, a speaker 170A, a receiver 170B, a microphone 170C, a headset jack 170D, a sensor module 180, a button 190, a motor 191, an indicator 192, a camera 193, a display 301, a subscriber identification module (SIM) card interface 195, and the like.

It may be understood that a structure illustrated in this embodiment does not constitute a specific limitation on the mobile phone 100. In some other embodiments of this application, the mobile phone 100 may include more or fewer components than those shown in the figure, or some components are combined, or some components are split, or component arrangements are different. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the mobile phone 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an integrated circuit (inter-integrated circuit, I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the communications module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the communications module 160 through a PCM bus interface. In some embodiments, the audio module 170 may also transmit an audio signal to the communications module 160 through the PCM interface, to implement a function of answering a call by using a Bluetooth headset. Both the I2S interface and the PCM interface may be configured to perform the audio communication.

The UART interface is a universal serial data bus, and is used to perform asynchronous communication. The bus may be a two-way communications bus. The bus switches to-be-transmitted data between serial communication and parallel communication. In some embodiments, the UART interface is usually configured to connect the processor 110 and the communications module 160. For example, the processor 110 communicates with a Bluetooth module in the communications module 160 through the UART interface, to implement a Bluetooth function. In some embodiments, the audio module 170 may transmit an audio signal to the communications module 160 through the UART interface, to implement a function of playing music by using a Bluetooth headset.

The MIPI interface may be configured to connect the processor 110 to a peripheral component such as the display 301 or the camera 193. The MIPI interface includes a camera serial interface (CSI), a display serial interface (DSI), and the like. In some embodiments, the processor 110 communicates with the camera 193 through the CSI interface, to implement a photographing function of the mobile phone 100. The processor 110 communicates with the display 301 through the DSI interface, to implement a display function of the mobile phone 100.

The GPIO interface may be configured by using software. The GPIO interface may be configured as a control signal, or may be configured as a data signal. In some embodiments, the GPIO interface may be configured to connect the processor 110 and the camera 193, the display 301, the communications module 160, the audio module 170, the sensor module 180, or the like. The GPIO interface may be further configured as the I2C interface, the I2S interface, the UART interface, the MIPI interface, or the like.

The USB interface 130 is an interface that conforms to a USB standard specification, and may be a mini USB interface, a micro USB interface, a USB Type-C interface, or the like. The USB interface 130 may be configured to connect to a charger to charge the mobile phone 100, or may be configured to transmit data between the mobile phone 100 and a peripheral device, or may be configured to connect to a headset, to play audio through the headset. The interface may be further configured to connect to another electronic device such as an AR device.

It may be understood that an interface connection relationship between the modules shown in this embodiment is merely an example for description, and does not constitute a limitation on the structure of the mobile phone 100. In some other embodiments of this application, the mobile phone 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the mobile phone 100. The charging management module 140 may further supply power to the electronic device through the power management module 141 while charging the battery 142.

The power management module 141 is configured to connect the battery 142, the charging management module 140, and the processor 110. The power management module 141 receives input of the battery 142 and/or the charging management module 140, and supplies power to the processor 110, the internal memory 121, an external memory, the display 301, the camera 193, the communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communications function of the mobile phone 100 may be implemented through the antenna 1, the antenna 2, the radio frequency module 150, the communications module 160, the modem processor, the baseband processor, and the like.

The antenna 1 and the antenna 2 are configured to transmit and receive electromagnetic wave signals. Each antenna in the mobile phone 100 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The radio frequency module 150 may provide a wireless communication solution that is applied to the mobile phone 100 and that includes 2G, 3G, 4G, 5G, and the like. The radio frequency module 150 may include at least one filter, a switch, a power amplifier, a low noise amplifier (LNA), and the like. The radio frequency module 150 may receive an electromagnetic wave through the antenna 1, perform processing such as filtering or amplification on the received electromagnetic wave, and transmit a processed electromagnetic wave to the modem processor for demodulation. The radio frequency module 150 may further amplify a signal modulated by the modem processor, and convert the signal into an electromagnetic wave for radiation through the antenna 1. In some embodiments, at least some function modules of the radio frequency module 150 may be disposed in the processor 110. In some embodiments, at least some function modules of the radio frequency module 150 may be disposed in a same device as at least some modules of the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (which is not limited to the speaker 170A, the receiver 170B, and the like), or displays an image or a video on the display 301. In some embodiments, the modem processor may be an independent component. In some other embodiments, the modem processor may be independent of the processor 110, and is disposed in a same device as the radio frequency module 150 or another function module.

The communications module 160 may provide a wireless communication solution that is applied to the mobile phone 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The communications module 160 may be one or more components integrating at least one communications processor module. The communications module 160 receives an electromagnetic wave through the antenna 2, performs frequency modulation and filtering processing on the electromagnetic wave signal, and sends a processed signal to the processor 110. The communications module 160 may further receive a to-be-sent signal from the processor 110, perform frequency modulation and amplification on the signal, and convert the signal into an electromagnetic wave for radiation through the antenna 2.

In some embodiments, the antenna 1 and the radio frequency module 150 of the mobile phone 100 are coupled, and the antenna 2 and the communications module 160 of the mobile phone 100 are coupled, so that the mobile phone 100 can communicate with a network and another device by using a wireless communications technology. The wireless communication technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The mobile phone 100 implements a display function by using the GPU, the display 301, the application processor, and the like. The GPU is a microprocessor for image processing, and is connected to the display 301 and the application processor. The GPU is configured to perform mathematical and geometric calculation, and render an image. The processor 110 may include one or more GPUs, which execute program instructions to generate or change display information.

In this embodiment, when the mobile phone 100 needs to wake up the display 301 in a black screen (or screen off) state, the mobile phone 100 may determine, based on a physical state of the foldable screen, a specific display screen or display region that is to be woken up. For example, the mobile phone 100 may determine the physical state of the foldable screen, which is also referred to as the physical state of the foldable device, based on an included angle between the primary screen and the back screen. The physical state may include a folded state or an unfolded state. For example, when the foldable screen is in the unfolded state, the mobile phone 100 may light up the primary screen and the back screen as a complete display screen; or when the foldable screen is in the folded state, the mobile phone 100 may display by using the primary screen facing the user, or wake up a touch event collection function of the back screen or the side screen. For example, the mobile phone 100 may light up a display screen closer to the user. In this way, when the foldable screen is in a different physical state, the mobile phone 100 may light up the display screen or display region at a corresponding position when the foldable screen is woken up, so that the user can obtain better viewing and operating experience when folding or unfolding the foldable screen.

The sensor module 180 may include one or more of a gyro, an acceleration sensor, a pressure sensor, a barometric pressure sensor, a magnetic sensor (for example, a Hall effect sensor), a distance sensor, an optical proximity sensor, a fingerprint sensor, a temperature sensor, a touch sensor, a pyroelectric infrared sensor, an ambient light sensor, or a bone conduction sensor. This is not limited in embodiments of this application.

The mobile phone 100 may implement a photographing function by using the ISP, the camera 193, the video codec, the GPU, the display 301, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and a skin color of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the mobile phone 100 may include one or N cameras 193, where N is a positive integer greater than 1.

The digital signal processor is configured to process a digital signal, and may process another digital signal in addition to the digital image signal. For example, when the mobile phone 100 selects a frequency, the digital signal processor is configured to perform Fourier transform on frequency energy, and the like.

The video codec is configured to compress or decompress a digital video. The mobile phone 100 may support one or more video codecs. In this way, the mobile phone 100 can play or record videos in a plurality of encoding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, with reference to a transfer mode between human brain neurons, and may further continuously perform self-learning. Applications such as intelligent cognition of the mobile phone 100, such as image recognition, facial recognition, speech recognition, and text understanding, can be implemented by using the NPU.

The external memory interface 120 may be configured to connect to an external memory card such as a micro SD card, to extend a storage capability of the mobile phone 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. Through running the instructions stored in the internal memory 121, the processor 110 executes various function applications and data processing of the mobile phone 100. The internal memory 121 may include a program storage area and a data storage area. The program storage area may store an operating system, an application required by at least one function (for example, a sound playing function or an image playing function), and the like. The data storage area may store data (such as audio data and an address book) created during use of the mobile phone 100, and the like. In addition, the internal memory 121 may include a high-speed random access memory, and may further include a non-volatile memory, for example, at least one magnetic disk storage device, a flash memory, and a universal flash storage (UFS).

The mobile phone 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The mobile phone 100 may listen to music or answer a hands-free call through the speaker 170A.

The receiver 170B, also referred to as an "earpiece", is configured to convert an audio electrical signal into a sound signal. When a call is answered or voice information is received by using the mobile phone 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound by moving a human mouth close to the microphone 170C, to input the sound signal to the microphone 170C. At least one microphone 170C may be disposed in the mobile phone 100. In some other embodiments, two microphones 170C may be disposed in the mobile phone 100, to collect a sound signal and further implement a noise reduction function. In some other embodiments, three, four, or more microphones 170C may alternatively be disposed in the mobile phone 100, to collect a sound signal, reduce noise, further identify a sound source, implement a directional recording function, and the like.

The headset jack 170D is configured to connect to a wired headset. The headset jack 170D may be the USB port 130, or may be a 3.5 mm open mobile terminal platform (OMTP) standard interface or a Cellular Telecommunications Industry Association of the USA (CTIA) standard interface.

The button 190 includes a power button, a volume button, and the like. The button 190 may be a mechanical button, or may be a touch button. The mobile phone 100 may receive button input, and generate button signal input related to user setting and function control of the mobile phone 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. With respect to touch operations in different regions of the foldable screen, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with and detaching from the mobile phone 100. The mobile phone 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type, or may be of different types. The SIM card interface 195 may be compatible with different types of SIM cards. The SIM card interface 195 may also be compatible with the external memory card. The mobile phone 100 interacts with a network by using the SIM card, to implement functions such as calling and data communication. In some embodiments, the mobile phone 100 uses an eSIM, that is, an embedded SIM card. The eSIM card may be embedded in the mobile phone 100, and cannot be separated from the mobile phone 100.

A software system of the mobile phone 100 may use a layered architecture, an event-driven architecture, a microkernel architecture, a microservice architecture, or a cloud architecture. In this embodiment, an Android system with a layered architecture is used as an example to describe the software structure of the mobile phone 100.

Figure 4:
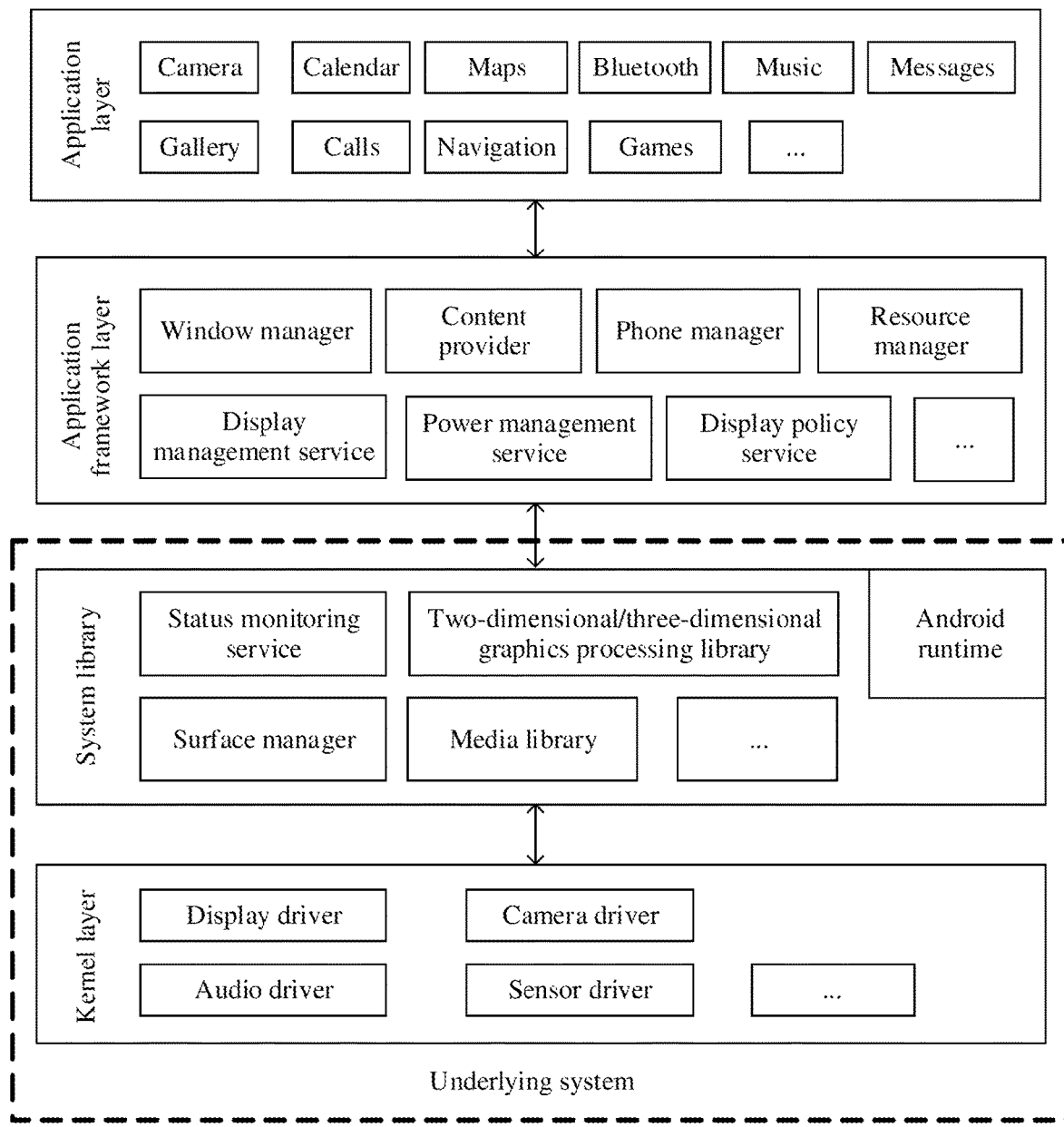
FIG. 4 is a block diagram of a software structure of a mobile phone 100 according to an embodiment of this application.

FIG. 4 is a block diagram of a software structure of a mobile phone 100 according to an embodiment of this application.

Software is divided into several layers by using the layered architecture, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 4, at least one application from Camera, Gallery, Calendar, Calls, Maps, Navigation, Bluetooth, Music, Games, Messages, and the like may be installed at the application layer, or another application may be installed. This is not limited in embodiments of this application.

The application framework layer provides an application programming interface (API) and a programming framework for an application at the application layer. The application framework layer includes some predefined functions.

As shown in FIG. 4, the application framework layer may include a display policy service, a power manager service (PMS), and a display manager service (DMS). Certainly, the application framework layer may further include an activity manager, a window manager, a content provider, a view system, a phone manager, a resource manager, a notification manager, and the like. This is not limited in embodiments of this application.

The display policy service may be used to obtain the current folding state of the foldable screen from an underlying display system. Furthermore, the display policy service may determine, based on the folding state of the foldable screen, a specific screen that needs to be woken up at present.

Still as shown in FIG. 4, the system library, the kernel layer, and the like below the application framework layer may be referred to as an underlying system. The underlying system includes an underlying display system configured to provide a display service. For example, the underlying display system includes a display driver at the kernel layer, a surface manager in the system library, and the like. In addition, the underlying system in this application further includes a status monitoring service for identifying the physical state of the foldable screen, and the status monitoring service may be independently provided in the underlying display system, or in the system library and/or the kernel layer.

For example, the status monitoring service may call a sensor service to start sensors such as a gyro and an acceleration sensor for detection. The status monitoring service may calculate a current included angle between the primary screen and the back screen based on detection data reported by each sensor. In this way, by using the included angle between the primary screen and the back screen, the status monitoring service may determine whether the foldable screen is in the unfolded state or the folded state. In addition, the status monitoring service may report the determined physical state to the display policy service.

In some embodiments, when the status monitoring service determines that the mobile phone is currently in the folded state, the status monitoring service may also start sensors such as a camera, an infrared sensor, an optical proximity sensor, or a touch sensor to identify a specific orientation of the mobile phone. For example, the specific orientation of the mobile phone may be used to determine which display region is the primary screen and which display region is the back screen. For example, when the mobile phone is in the folded state, the mobile phone may determine a display region facing the user as the primary screen, then determine a display region not facing the user as the back screen, determine a display region between the primary screen and the back screen as the secondary screen, and light up the primary screen for display. In addition, touchscreens on the secondary screen and the back screen may also be woken up, that is, a touch event collection function of the back screen and the secondary screen each is woken up.

It should be understood that facing the user referred to herein includes facing the user at a substantially parallel angle between the display region and the user face, or includes facing the user at an oblique angle.

The main idea of this application is to set a custom key on the back screen and/or the secondary screen of the foldable device to implement simulated touch at a specific position on the primary screen. The following uses a mobile phone as an example of the foldable device, and describes in detail a method for customizing a key according to an embodiment of this application with reference to the accompanying drawings.

Figure 5:
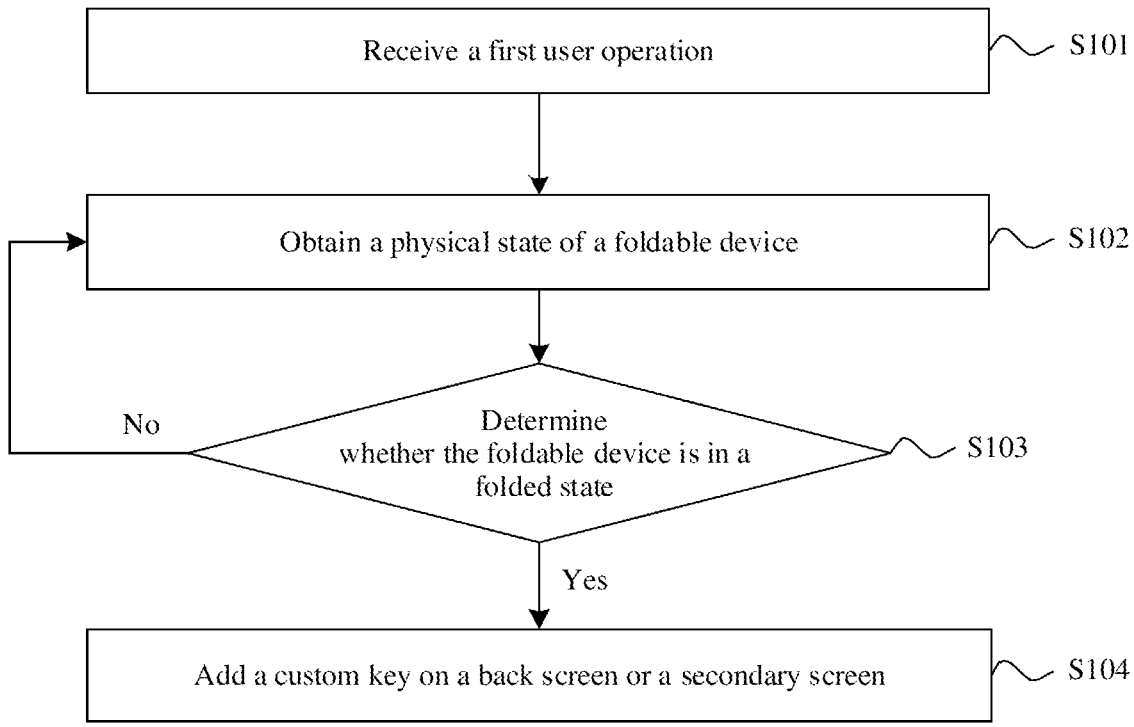
FIG. 5 is a schematic flowchart of a method for customizing a key of a foldable device shown in an embodiment of this application.

FIG. 5 is an example schematic flowchart of a method for customizing a key of a foldable device shown in an embodiment of this application. As shown in FIG. 5, the method includes the following steps.

S101: Receive a first user operation.

The first user operation is used to indicate the foldable device to add a custom key on a back screen and/or a secondary screen, and may be used as a start operation for adding a custom key. After the first user operation, the foldable device triggers a process of setting the custom key.

For example, the first user operation may be tapping a custom key setup button. The custom key setup button may be set on HiBoard, a pull-up menu, a pull-down menu, or system settings. This is not limited in embodiments of this application. It may be understood that the first user operation includes but is not limited to this.

S102: Obtain a physical state of the foldable device.

The physical state includes a folded state or an unfolded state. For example, the foldable device may determine whether the foldable device is in the unfolded state or the folded state based on a magnitude of an included angle θ between a primary screen and the back screen. When the included angle θ meets a first condition, it is determined that the foldable device is in the unfolded state. When the included angle meets a second condition, it is determined that the foldable device is in the folded state. For example, the first condition may be $(180-a)<θ<(180+α)$, where α is a non-negative angle value. α may be 0 or slightly greater than 0; different from the first condition, the second condition may be $β1<θ<β2$, β2 may be 180, or β2 may be slightly less than 180, and β1 may be any value greater than or equal to 0 and less than β2. It should be noted that in this embodiment, another method may also be used to determine the folded state and/or unfolded state of the foldable device. This is not limited in embodiments of this application.

S103: Determine whether the foldable device is in the folded state.

If the foldable device is in the folded state, adding of a custom key is triggered (that is, step 104 is performed). If the foldable device is in the unfolded state, the foldable device may repeatedly perform step 102 and step 103 until the physical state of the foldable device changes from the unfolded state to the folded state, and then adding of a custom key is triggered (step 104 is performed).

S104: Add a custom key on the back screen or the secondary screen.

Adding a custom key may include: setting attributes of the custom key and setting a touch event corresponding to the custom key.

The attributes of the custom key may include a key size, a key shape, and a key position.

Figure 6:
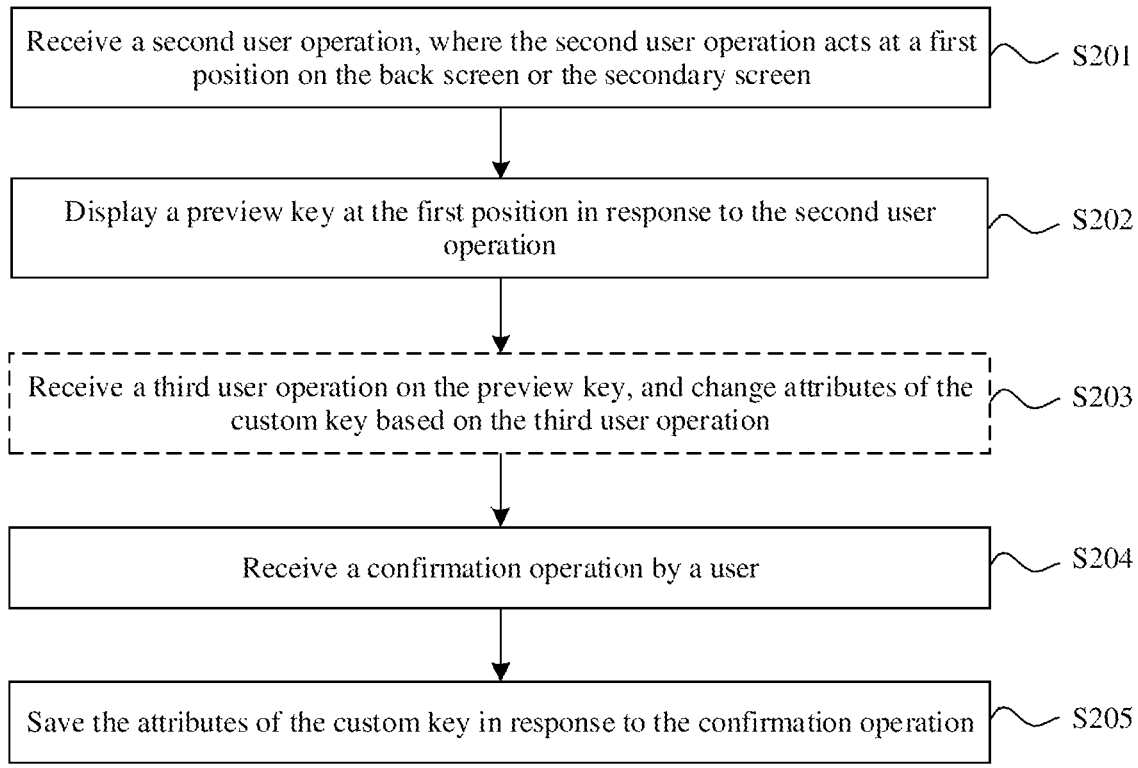
FIG. 6 is a schematic flowchart of setting attributes of a custom key according to an embodiment of this application.

For example, FIG. 6 is a schematic flowchart of setting attributes of a custom key according to an embodiment of this application. As shown in FIG. 6, a process of setting the attributes of the custom key in S104 may include:

S201: Receive a second user operation, where the second user operation is performed at a first position on the back screen or the secondary screen.

The second user operation is used to select a position for setting the custom key on the back screen or the secondary screen. It may be understood that the second user operation may be a user operation performed at any first position on the back screen or the secondary screen. The second user operation may include: tap, double tap, slide, and the like. The first position may be any point on the back screen or the secondary screen, or may be any region on the back screen or the secondary screen. This is not limited in embodiments of this application.

Optionally, the foldable device may determine the shape or the size of the custom key based on a track of the second user operation.

For example, when the second user operation is a tap or double tap operation, a circular or rectangular custom key with a preset size may be generated and displayed at an operation position. When the second user operation is slide, a custom key may be generated based on a track of the slide operation. For example, the foldable device may generate a rectangular custom key when the slide track is a straight line; or may generate a circular custom key when the track of the second user operation is a circle. When the slide track is a straight line with a length of L (that is, a slide distance is L), a rectangular custom key with a length of L may be generated. The shape or the size of the custom key corresponding to the specific second user operation may be set based on an actual situation. This is not limited in embodiments of this application.

S202: Display a preview key at the first position in response to the second user operation.

The preview key is used to identify the attributes of the custom key, such as the size, the shape, and the position of the custom key. That is, the user may confirm some attributes of the custom key, such as the size, the shape, and the position of the key.

S204: Receive a confirmation operation performed by the user.

The confirmation operation may be tapping a confirmation control. This is not limited in embodiments of this application.

S205: Save the attributes of the custom key in response to the confirmation operation.

The foldable device may provide a confirmation control on an interface, and in response to tapping the confirmation control by the user (that is, the confirmation operation), the foldable device saves the attributes of the custom key.

Optionally, after step S202 and before step S204, step S203 may be further included: receiving a third user operation on the preview key, and changing the attributes of the custom key based on the third user operation.

The third user operation may be tapping, touching, selecting, or dragging the custom key. This is not limited in embodiments of this application.

That is, after the preview key is displayed in response to the second user operation, if attributes of the preview key do not meet user requirements, the user may change the attributes of the custom key, such as moving a position of the preview key or adjusting a size of the preview key, to set a custom key that can meet the user requirements.

Optionally, the attributes of the custom keys may further include a type of a touch operation and the like. The user may set a touch operation of the custom key as required. For example, the touch operation may be set as tap, and then in response to a tap operation on the custom key, the foldable device executes a touch event corresponding to the custom key. It may be understood that the type of the touch operation is not limited to the foregoing tap operation, and may alternatively be slide, touch and hold, or the like. This is not limited in embodiments of this application. When the type of the touch operation is touch and hold, the user may further set operation duration; and when the type of the touch operation is slide, the user may further set a slide distance and the like. Optionally, when the preview key is displayed, the foldable device may display a motion effect, and the motion effect is used to identify the touch operation of the custom key.

Figure 7:
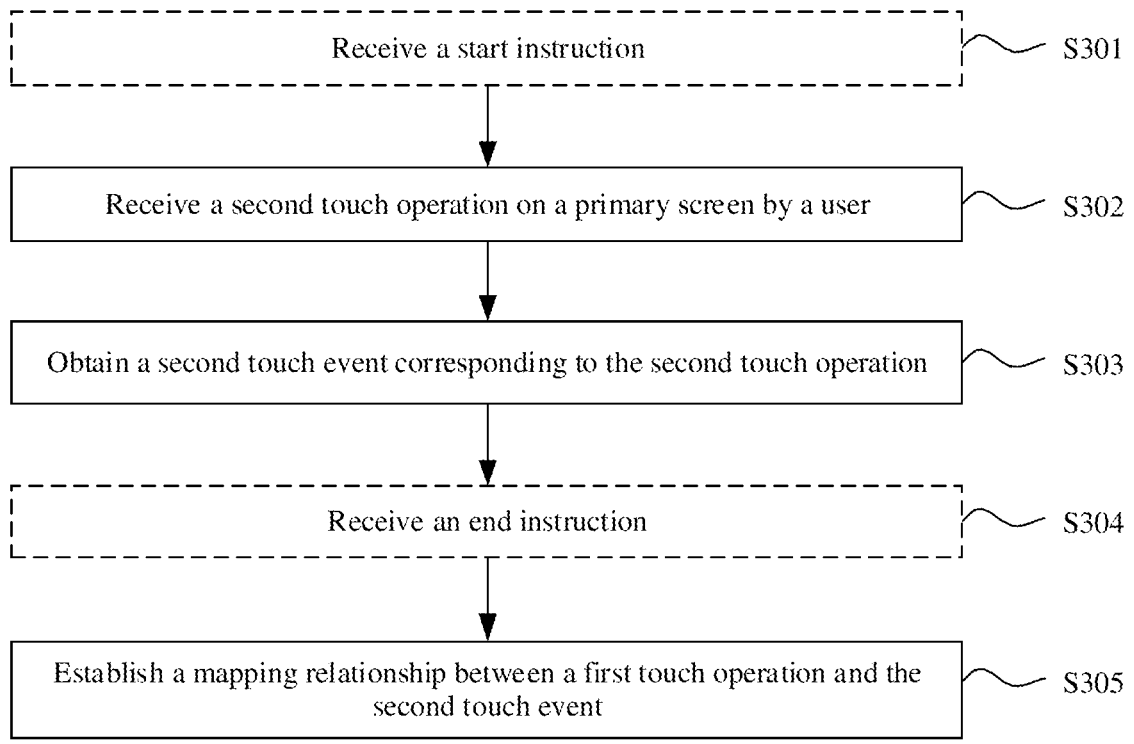
FIG. 7 is a schematic flowchart of setting a touch event corresponding to a custom key according to an embodiment of this application.

For example, FIG. 7 is a schematic flowchart of setting a touch event corresponding to a custom key according to an embodiment of this application. As shown in FIG. 7, a process of setting the touch event corresponding to the custom key in step S104 may include:

S302: Receive a second touch operation performed by the user on the primary screen.

S303: Obtain a second touch event corresponding to the second touch operation.

S305: Establish a mapping relationship between a first touch operation on the custom key and the second touch event.

After the user adds the custom key on the back screen or the secondary screen, the foldable device may directly obtain the second touch event corresponding to the second touch operation in response to the second touch operation performed on the primary screen by the user. After the foldable device obtains the second touch event corresponding to the second touch operation, the foldable device may directly establish the mapping relationship between the first touch operation on the custom key and the second touch event, and store the mapping relationship. For example, the second touch event may include one or more of the following events: ACTION_DOWN, ACTION_UP, ACTION_MOVE, ACTION_POINTER_UP, and ACTION_POINTER_DOWN. It should be noted that when a plurality of custom keys are added, the user may set attributes of each custom key and a corresponding touch event in sequence, or after attributes of the plurality of custom keys are set, custom keys to be set may be selected in sequence to set corresponding touch events. This is not limited in embodiments of this application.

Optionally, before S302, step S301 may be further included: receiving a start instruction. The meaning is that the second touch operation performed by the user on the primary screen can be obtained after a trigger operation is received. Before S305, step S304 may be further included: receiving an end instruction. The end instruction instructs the foldable device to end obtaining the second touch operation. The start instruction or the end instruction may be an instruction generated by an operation of the user on a mechanical key of the foldable device, or an instruction generated by a touch operation at a specific touch position.

It should be noted that the set custom key may simulate a single-touch operation on the primary screen, or may simulate a multi-touch operation on the primary screen. The set custom key may simulate one touch operation on the primary screen, or may simulate a plurality of touch operations on the primary screen. That is, the second touch operation may be a plurality of touch operations. After receiving the start instruction, and before receiving the end instruction, the foldable device may obtain a second touch event corresponding to a plurality of touch operations performed on the primary screen by the user, and then, as described in step 305, establish a mapping relationship between the first touch operation on the custom key added on the back screen or the secondary screen and the second touch event. It may be understood that the second touch event may be one event corresponding to a plurality of consecutive touch operations on the primary screen, or may be a plurality of consecutive events corresponding to a plurality of consecutive touch operations on the primary screen.

To facilitate understanding, the foregoing process of customizing a key is described below with reference to specific examples.

Figure 8A:
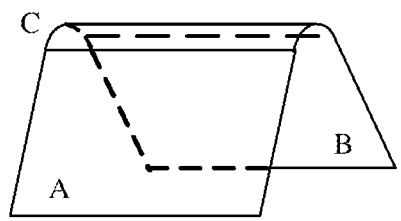
FIG. 8(*a*) and FIG. 8(*b*) each is a schematic diagram of a physical state of a mobile phone according to an embodiment of this application.
Figure 8B:
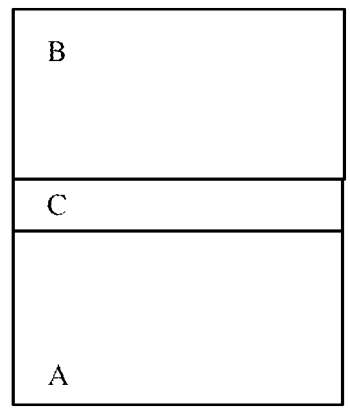

FIG. 8(a) and FIG. 8(b) each are a schematic diagram of a physical state of a mobile phone according to an embodiment of this application. As shown in FIG. 8(a), when the mobile phone is in a folded state, a touchscreen is divided into three regions: a region A, a region B, and a region C with folding lines as boundaries. The region A that faces a user is a primary screen, the region B that faces away from the user is a back screen, and the region C is a secondary screen. A schematic diagram of region division of the foregoing several regions is shown in FIG. 8(b). It should be noted that in a process of adding a custom key, the mobile phone is in the folded state, and the screen unfolded in the accompanying drawing for description is only for ease of viewing by readers. This does not indicate that the mobile phone is in an unfolded state.

For example, the user taps a custom key setup button in system settings to trigger the process of adding the custom key, so that the user can add the custom key on the back screen (for example, the region B) or the secondary screen (for example, the region C) of the mobile phone.

Figure 9A:
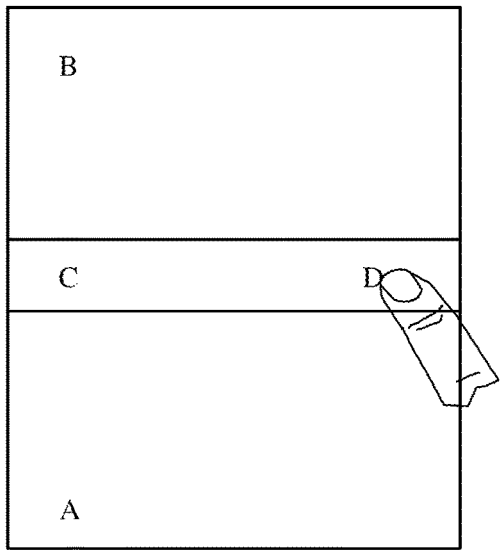
FIG. 9(*a*) to FIG. 9(*d*) are schematic diagrams of adding of a custom key according to an embodiment of this application.
Figure 9B:
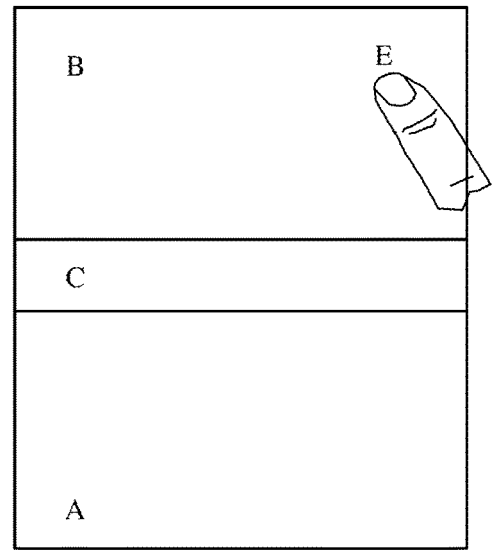
Figure 9C:
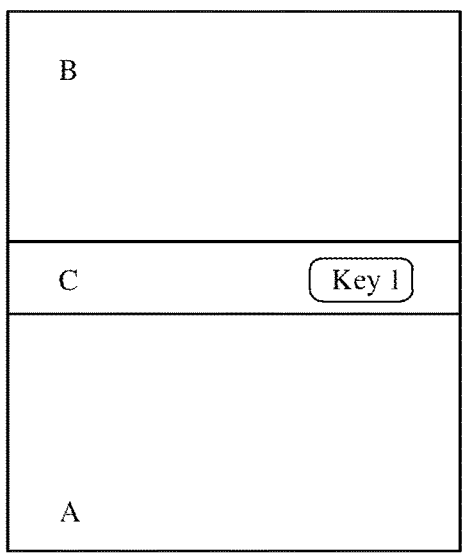
Figure 9D:
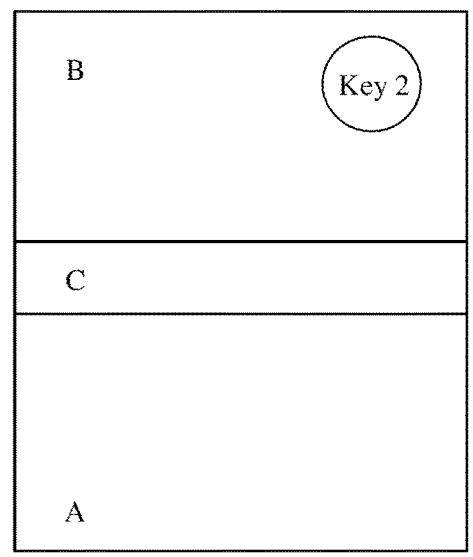

FIG. 9(a) to FIG. 9(d) are schematic diagrams of adding of a custom key according to an embodiment of this application. For example, as shown in FIG. 9(a) and FIG. 9(b), a user may tap a position (for example, a position D or a position E) on a secondary screen (for example, a region C) or a back screen (for example, a region B) to indicate a foldable device to set a custom key at the position. In response to the foregoing second user operation (a tap operation at the position D, or a tap operation at the position E), as shown in FIG. 9(c) and FIG. 9(d), a mobile phone may display a preview key (for example, a key 1 or a key 2) with the position (the position D or the position E) tapped by the user as a center. The preview key may be a key with a preset size and a preset shape. For example, when the user taps the secondary screen, the preview key is a rectangular key with a preset size. For example, when the user taps the back screen, the preview key is a circular key with a preset size.

Figure 10A:
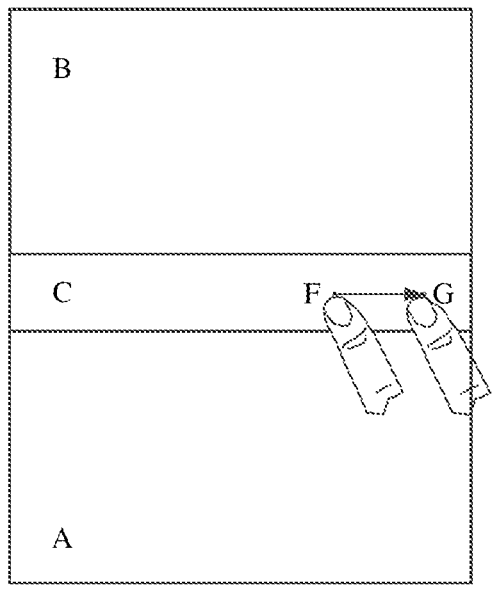
FIG. 10(*a*) to FIG. 10(*d*) are schematic diagrams of adding of another custom key according to an embodiment of this application.
Figure 10B:
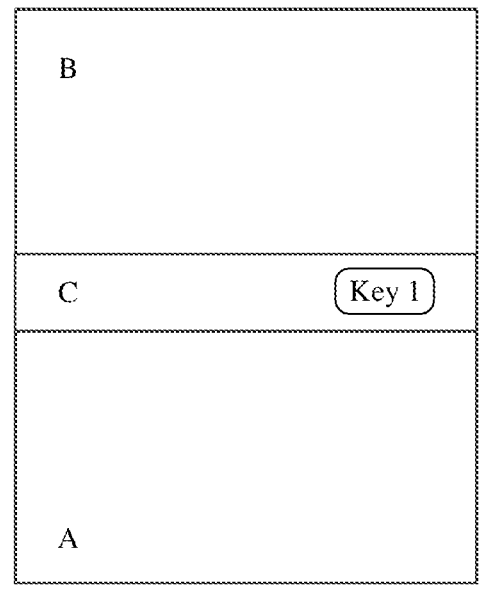
Figure 10C:
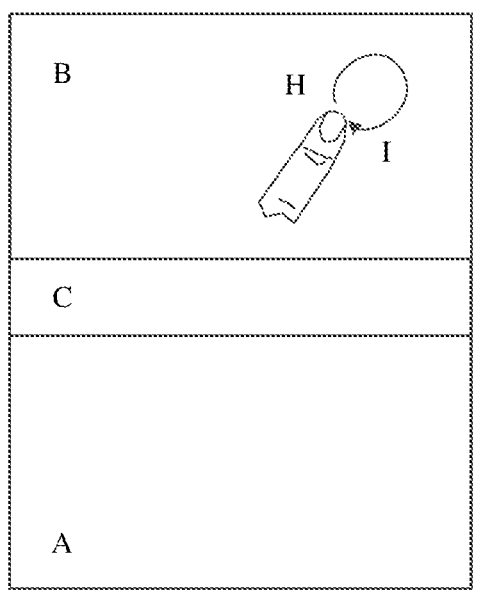
Figure 10D:
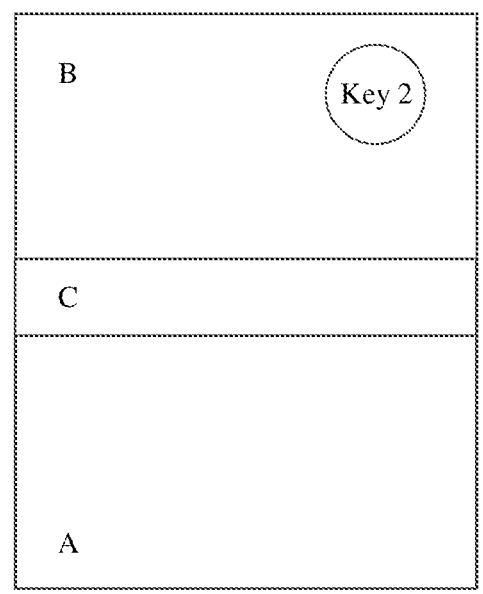

FIG. 10(a) to FIG. 10(d) are schematic diagrams of adding of another custom key according to an embodiment of this application. For another example, as shown in FIG. 10(a) to FIG. 10(d), an operation of a user may alternatively be a slide operation. For example, as shown in FIG. 10(a), in response to a slide operation of the user from a position F to a position G, a mobile phone may display a preview key (for example, a key 1) between a starting point (the position F) and an end point (the position G) of the slide operation. A slide distance may be used to determine a size of the preview key. For example, a length of the preview key is equal to the slide distance. For example, a key 1 in FIG. 10(b) is a preview key displayed in response to the slide operation from F to G in FIG. 10(a), and a length of the key 1 is equal to the slide distance from F to G. For another example, as shown in FIG. 10(c), in response to a slide operation of the user from a position H to a position I, the mobile phone displays a preview key (for example, a key 2) in a region in which a slide track is located. Based on a size of the region enclosed by the slide track, if the preview key is determined to be a circular one, a length of the slide track may be used to determine a diameter of the preview key. For example, a key 2 in FIG. 10(d) is a preview key in response to the slide operation from H to I in FIG. 10(c), and a diameter of the key 2 is determined based on the length of the slide track from F to G.

Figure 11A:
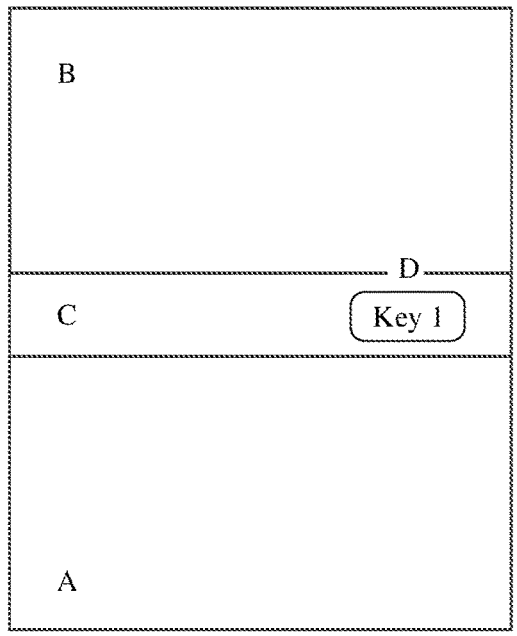
FIG. 11(*a*) and FIG. 11(*b*) are a schematic diagram of setting attributes of a custom key according to an embodiment of this application.
Figure 11B:
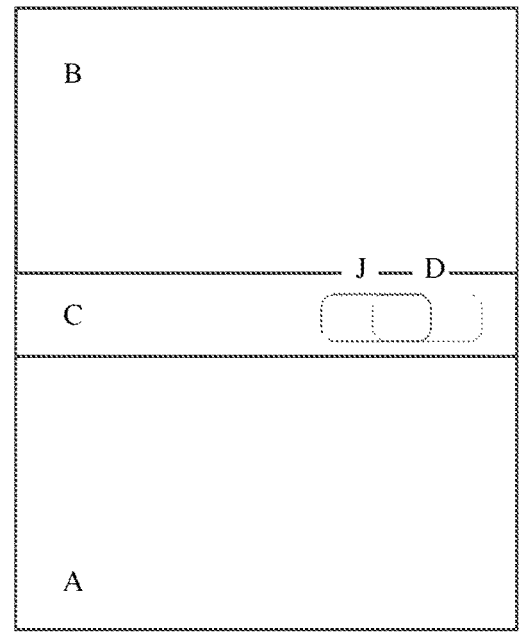

Optionally, the user may further operate the preview key to set a position, a size, a shape, a name, and the like of the custom key. For example, FIG. 11(a) and FIG. 11(b) are an example schematic diagram of setting attributes of a custom key according to an embodiment of this application. As shown in FIG. 11(a) and FIG. 11(b), a user may drag a preview key (for example, a key 1) at a position D to a position J (in the figure, the key 1 is shown in gray before being dragged, and is shown in black after being dragged), and in this manner, the position of the custom key can be adjusted.

In addition, the user may also perform a tap operation on a graphic of the preview key to trigger setting of at least one of attributes of the custom key: a size, a shape, and a name. In view of the setting of different attributes of the custom key, a foldable device may remind the user to input the attributes in a preset order, or may display a plurality of input boxes on a same interface, so that the user can input each attribute. After attributes of custom keys are set, the foldable device stores attributes of each custom key, so that during use of the foldable device, a specific custom key on which a touch operation is performed can be determined based on a position of an operation of the user.

For example, the foldable device may further prompt the user to set a first touch operation on the custom key. For example, the mobile phone may display options of a plurality of operation types, to prompt the user to select different operation types, such as touch and hold, press, tap, double tap, and slide.

For example, in a specific implementation, the foldable device may further prompt the user to select operation duration for setting the first touch operation on the custom key. The user may set the operation duration of the first touch operation in at least two manners.

With a mobile phone as an example, in a first manner, the mobile phone may prompt, by displaying a plurality of operation duration options, the user to select different operation duration or different operation duration ranges, for example, displaying operation duration such as 1 second, 2 seconds, and 3 seconds, or displaying operation duration ranges such as 1-5 seconds, 6-10 seconds, and more than 10 seconds. The user may select different operation duration based on the options displayed on the mobile phone. In a second manner, the mobile phone may directly display an input box, to prompt the user to input operation duration of a touch operation in the input box, for example, the user inputs operation duration of 10 seconds.

Figure 12A:
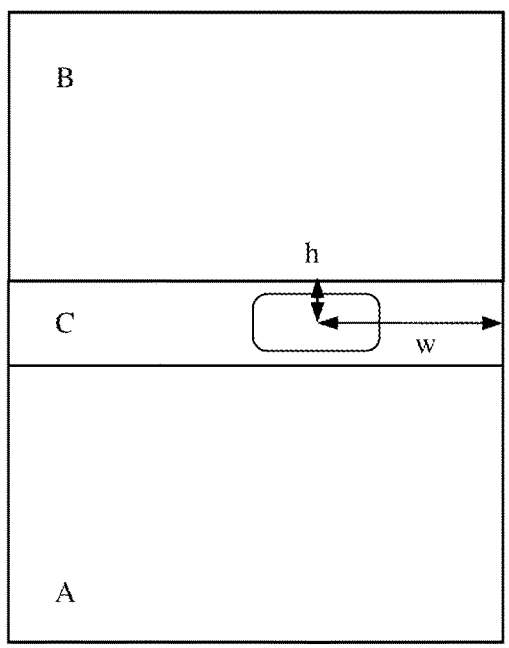
FIG. 12(*a*) and FIG. 12(*b*) each are a schematic diagram of position coordinates of a custom key according to an embodiment of this application.
Figure 12B:
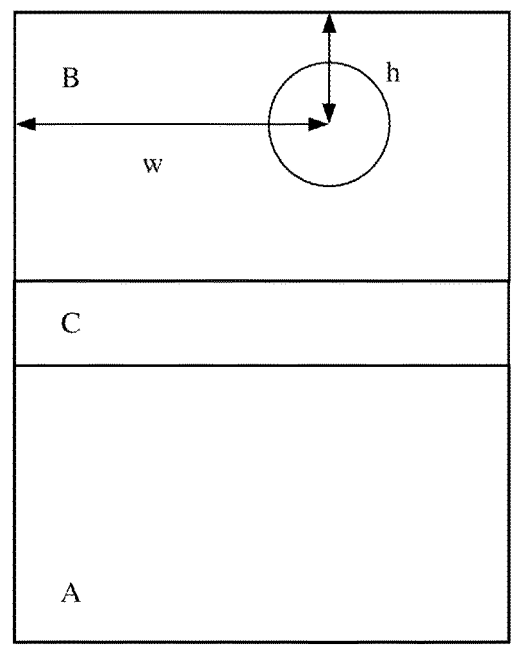

FIG. 12(a) and FIG. 12(b) each are a schematic diagram of position coordinates of a custom key according to an embodiment of this application. After a custom key is added on a back screen or a secondary screen of a mobile phone and attributes of the custom key are set, the mobile phone needs to store pixel coordinates of the custom key. For example, coordinates of a key 1 shown in FIG. 12(a) are (w, h), and coordinates of a key 2 shown in FIG. 12(b) are (w, h). After attributes of the custom keys are set, the mobile phone stores the coordinates of the key 1 and the key 2.

Through the processes shown in the FIG. 9(a) to FIG. 12(b), the user completes the process of adding a custom key on the back screen or the secondary screen of the foldable device, and setting attributes of the custom key. Based on the prompt of the foldable device, the user may perform a confirmation operation on the foldable device to confirm adding of the custom key. The foldable device saves the attributes of the custom key based on the confirmation operation of the user.

Further, after the attributes of the custom key are set, the foldable device may complete a process of setting a touch event corresponding to the custom key based on an operation of the user.

In the solution of the custom key according to this application, the custom key set on the secondary screen or the back screen of the foldable device may implement simulation of a single touch operation on the primary screen, or simulation of a plurality of touch operations on the primary screen. When the custom key simulates a single touch operation on the primary screen, for a process of setting a touch event corresponding to the custom key, refer to the solution shown in FIG. 13. When the custom key simulates a plurality of touch operations on the primary screen, for a process of setting a touch event corresponding to the custom key, refer to the solution shown in FIG. 14.

For example, to better improve user convenience, a prompt may be added to the mobile phone, so that the user can select setting of a single touch operation or setting of a plurality of touch operations based on the prompt, and then a process of setting a touch event corresponding to a specific custom key is implemented. During specific implementation, the prompt may be displayed after the mobile phone receives a confirmation operation of the user, or may be displayed when the mobile phone receives a first user operation and starts a process of adding a custom key. This is not limited in embodiments of this application.

Figure 13:
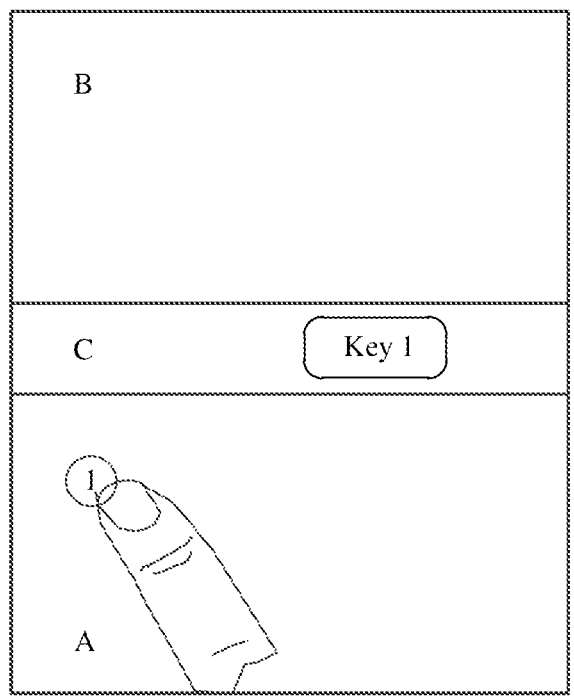
FIG. 13 is a schematic diagram of setting a touch event of a custom key according to an embodiment of this application.

FIG. 13 is a schematic diagram of setting a touch event of a custom key according to an embodiment of this application. As shown in FIG. 13, based on the process of adding a custom key on the secondary screen or the back screen of the mobile phone in the foregoing embodiment, after the user adds a custom "key 1" on the secondary screen of the mobile phone, a touch event corresponding to the custom "key 1" needs to be set. The user may perform a second touch operation on the primary screen (for example, a region A) of the mobile phone. For example, as shown in FIG. 13, the user taps a position of a reference sign 1 in an upper left corner of the primary screen (for example, a region A). After obtaining the second touch operation, in response to the second touch operation, the mobile phone obtains a second touch event corresponding to the second touch operation, and makes the second touch event correspond to a first touch operation on the custom "key 1" to establish a mapping relationship.

Optionally, in addition to making the custom key correspond to the operation on the primary screen by using the mapping relationship between the second touch event and the first touch operation, the mobile phone may associate them in another manner. For example, the mobile phone records pixel coordinates of the second touch operation performed by the user on the primary screen, and makes the pixel coordinates correspond to the custom "key 1" in the system. Alternatively, a name of the "key 1" corresponds to the second touch operation on the primary screen; or the name of the "key 1" may correspond to the second touch event corresponding to the second touch operation on the primary screen; or the first touch operation on the "key 1" may correspond to the second touch operation on the primary screen; or the first touch operation on the "key 1" may correspond to the second touch event corresponding to the second touch operation on the primary screen. This is not limited in embodiments of this application.

After the correspondence relationship between the custom key and the touch operation on the primary screen is set, when the user performs the first touch operation on the "key 1" on the secondary screen (for example, a region C) of the mobile phone during use of the mobile phone, an effect of the second touch operation at this position on the primary screen can be simulated.

Figure 14:
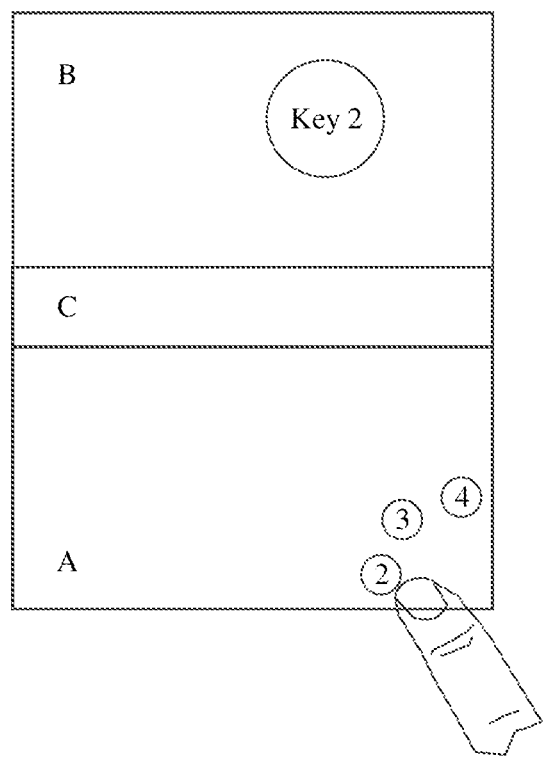
FIG. 14 is a schematic diagram of setting a touch event of another custom key according to an embodiment of this application.

FIG. 14 is a schematic diagram of setting a touch event of another custom key according to an embodiment of this application. As shown in FIG. 14, based on the process of adding a custom key on the secondary screen or the back screen of the mobile phone in the foregoing embodiment, after the user adds a custom "key 2" on the back screen of the mobile phone, a touch event corresponding to the custom "key 2" needs to be set. The user may perform a second touch operation on the primary screen (for example, a region A) of the mobile phone, and the second touch operation may be a plurality of touch operations. After obtaining the plurality of touch operations performed on the primary screen by the user, the mobile phone obtains a second touch event corresponding to the plurality of touch operations, and establishes a correspondence relationship between the second touch event and the custom "key 2".

The user taps two or more positions on the primary screen in sequence based on an order of touch operations to be set. For example, as shown in FIG. 14, the user taps three positions 2, 3, and 4 on the primary screen in sequence. The mobile phone records coordinates of the positions at which the touch operations are performed, as well as a tapping order. In addition, the mobile phone obtains a touch event corresponding to operations of tapping 2, 3, and 4 in sequence by the user, and makes the touch event correspond to the custom key "key 2" added on the back screen. During use of the mobile phone, when the user performs a touch operation on the "key 2" on the back screen, touch operations at the positions 2, 3, and 4 on the primary screen can be implemented.

For example, during specific implementation of simulating a plurality of touch operations on the primary screen by using custom keys, because positions of keys are different during use of each application, the user cannot accurately remember positions, an order, and the like of several combined keys in an application, which leads to difficulties in setting a touch event corresponding to custom keys. Based on this, a start instruction that triggers obtaining of a plurality of touch operations and an end instruction may be set in the mobile phone. The user operates a preset key of the mobile phone to generate a start instruction, which triggers the mobile phone to start to obtain touch operations of the user on the primary screen. For example, the user operates a volume + key of the mobile phone to trigger the start instruction. The user operates another preset key of the mobile phone to generate an end instruction, so that the mobile phone ends the process of obtaining the touch operations on the primary screen. For example, the user operates a volume − key of the mobile phone to trigger the end instruction.

In the foregoing process, between a time when the mobile phone receives the start instruction and a time when the mobile phone receives the end instruction, the mobile phone receives all touch operations of the user (that is, a second touch operation) on the primary screen, then obtains a corresponding second touch event based on these touch operations, and establishes a correspondence relationship between the second touch event and the first touch operation on the custom key. In this solution, it should be understood that the second touch event corresponding to these touch operations may be a plurality of sequentially executed touch events, or may be one touch event. This is not limited in embodiments of this application.

Based on the solution for adding a custom key according to the foregoing implementation, a custom key is added on the secondary screen or the back screen of the foldable device. During use of the foldable device, a touch operation on the primary screen can be simulated by performing a simulated operation on the custom key on the secondary screen or the back screen, effectively resolving a problem of screen blocking when an operation is performed on the primary screen.

Figure 15:
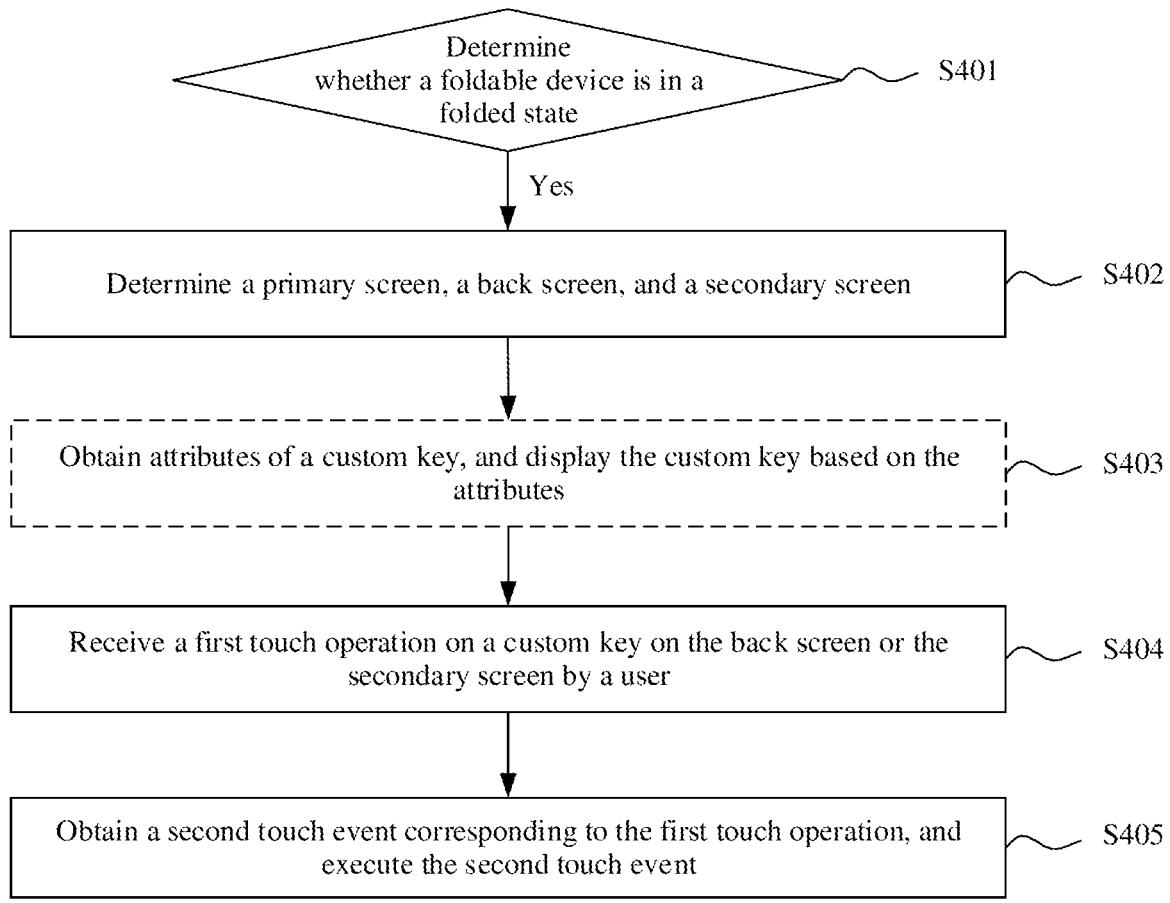
FIG. 15 is a schematic diagram of a method for application of a custom key according to an embodiment of this application.

FIG. 15 is a schematic diagram of a method for application of a custom key according to an embodiment of this application. As shown in FIG. 15, the method includes the following several steps.

S401: Determine whether a foldable device is in a folded state.

S402: Determine a primary screen, a back screen, and a secondary screen.

The foldable device determines its own physical state first. Similar to that in the manner of determining the physical state in the solution shown in FIG. 5, the physical state of the foldable device includes a folded state or an unfolded state.

After determining that the foldable device is in the folded state, the foldable device may further determine the primary screen, the back screen and the secondary screen of the foldable device.

S404: Receive a first touch operation performed by a user on a custom key on the back screen or the secondary screen.

The user may perform a touch operation, such as tap or slide, on the custom key set on the back screen or the secondary screen. The foldable device receives, by using a touch sensor, the first touch operation performed by the user on the custom key on the secondary screen or the back screen.

Optionally, during specific application of this solution, the user cannot directly see each position on the back screen or the secondary screen. As a result, when the user performs a touch operation on the secondary screen or the back screen, the user may not be able to accurately operate the custom key. Based on this, according to a specific touch position detected by the touch sensor and attributes of each custom key, the foldable device may further determine whether a custom key is set at the touch position, to obtain the first touch operation.

Optionally, after obtaining the first touch operation performed by the user on the custom key on the back screen or the secondary screen, the foldable device may further determine its physical state again. In this case, if the foldable device is in the folded state, according to the following steps, the first touch operation is mapped to a second touch event for execution, and if the foldable device is in the unfolded state, no response is made to an operation on the custom key.

S405: Obtain a second touch event corresponding to the first touch operation, and execute the second touch event.

When custom keys are added on the back screen or the secondary screen of the foldable device, a mapping relationship between a first touch operation on each custom key and a second touch event corresponding to a second touch operation on the primary screen is established. During application of the foldable device, when a first touch operation is received, a corresponding second touch event can be obtained directly based on the mapping relationship.

For example, before step S404, the method further includes step S403: Obtain attributes of the custom key, and display the custom key based on the attributes. The meaning is that after the foldable device determines the primary screen, the secondary screen, and the back screen, the foldable device obtains attributes of a preset custom key, including a position, a size, a shape, a position, and the like thereof. Then the custom key is displayed on the secondary screen or the back screen based on the attributes, so that the user can accurately operate the custom key.

In the method for application of a custom key in this solution, when the foldable device is in the folded state, a touch operation on the primary screen can be simulated by using a custom key added on the back screen or the secondary screen. This can effectively resolve a problem of screen blocking when an operation is performed on the primary screen.

In addition, based on conventional operating habits, when the foldable device is in the folded state, the user can use an index finger and a middle finger when operating the back screen or the secondary screen, which reduces operation difficulties.

Figure 16:
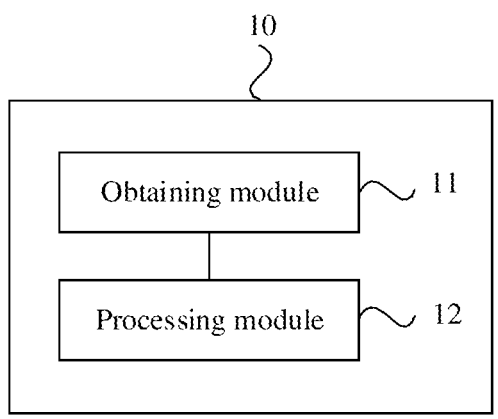
FIG. 16 is a schematic diagram of a structure of a foldable device embodiment according to an embodiment of this application.

FIG. 16 is a schematic diagram of a structure of a foldable device embodiment according to an embodiment of this application. As shown in FIG. 16, when the foldable device 10 is in a folded state, a touchscreen of the foldable device is divided into three regions: a primary screen, a back screen, and a secondary screen, and the foldable device 10 includes:

an obtaining module 11, configured to receive a first user operation, where the first user operation is used to indicate the foldable device to add a custom key on the back screen or the secondary screen; and a processing module 12, configured to obtain a physical state of the foldable device, where the physical state includes a folded state or an unfolded state, where if the foldable device is in the folded state, the processing module 12 is further configured to add the custom key on the back screen or the secondary screen based on the first user operation.

Optionally, the processing module 12 is further configured to:

receive a second user operation, where the second user operation is performed at a first position on the back screen or the secondary screen;

add the custom key at the first position in response to the second user operation;

receive a second touch operation performed by a user on the primary screen; and establish a mapping relationship between a first touch operation on the custom key and a second touch event corresponding to the second touch operation based on the second touch operation.

Optionally, the processing module 12 is further configured to:

display a preview key at the first position on the back screen or the secondary screen in response to the second user operation;

receive a confirmation operation performed by the user, and save attributes of the custom key in response to the confirmation operation.

Optionally, the obtaining module 11 is further configured to receive a third user operation performed on the preview key by the user, and the processing module 12 is further configured to change the attributes of the custom key based on the third user operation.

Optionally, the obtaining module 11 is further configured to: when the foldable device is in the folded state, receive the first touch operation performed on the custom key on the back screen or the secondary screen by the user; and the processing module 12 is further configured to obtain the second touch event corresponding to the first touch operation, and execute the second touch event.

The foldable device according to any one of the foregoing implementations is used to implement the technical solutions in the foregoing method embodiments, and implementation principles and technical effects thereof are similar. Details are not described herein again.

Figure 17:
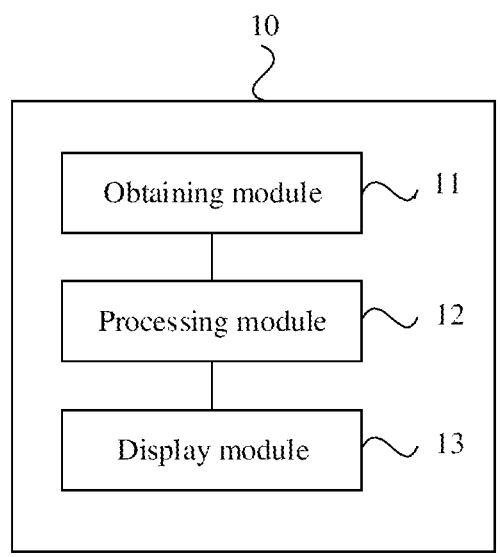
FIG. 17 is a schematic diagram of a structure of another foldable device embodiment according to this application.

FIG. 17 is a schematic diagram of a structure of another foldable device embodiment according to an embodiment of this application. As shown in FIG. 17, on the basis of the embodiment shown in FIG. 16, the foldable device 10 further includes a display module 13.

The processing module 12 is further configured to obtain the attributes of the custom key; and the display module 13 is configured to display the custom key on the back screen or the secondary screen based on the attributes.

Optionally, the processing module 12 is further configured to:

determine the primary screen, the back screen, and the secondary screen of the foldable device.

The foldable device according to any one of the foregoing implementations is used to implement the technical solutions in the foregoing method embodiments, and implementation principles and technical effects thereof are similar. Details are not described herein again.

Figure 18:
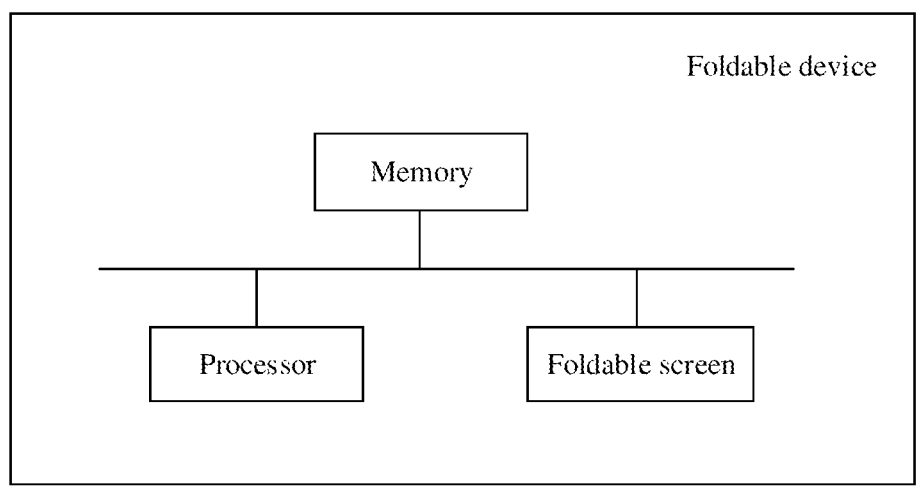
FIG. 18 is a schematic diagram of a structure of still another foldable device embodiment according to an embodiment of this application.

FIG. 18 is a schematic diagram of a structure of still another foldable device embodiment according to an embodiment of this application. As shown in FIG. 18, the foldable device includes a processor, a memory, and a foldable screen, where the memory is configured to store a computer program; and the processor is configured to execute the computer program stored in the memory, so that the folding apparatus performs the technical solution according to any one of the foregoing method embodiments. The processor and the memory may be independent, or may be integrated. This is not limited in this solution.

In the foldable device, the processor may be the processor 110 shown in FIG. 3, the memory may be the internal memory 121 and/or the external memory 120, as shown in FIG. 3, and the foldable screen may include the display 301 and the touch sensor 180K shown in FIG. 3.

This application further provides a computer-readable storage medium, where a program or instructions is/are stored in the computer-readable storage medium, and when the program or the instructions is/are run on a computer, the technical solution according to any one of the foregoing method embodiments is executed.

A person of ordinary skill in the art should understand that all or some of the steps of the method embodiments may be implemented by a program instructing relevant hardware. The program may be stored in a computer-readable storage medium. When the program is executed, the steps of the method embodiments are performed. The foregoing storage medium includes any medium that can store program code, such as a ROM, a RAM, a magnetic disk, or an optical disc. A specific medium type is not limited in embodiments of this application.

What is claimed is:

1. A method for customizing a key of a foldable device, wherein when the foldable device is in a folded state, a touchscreen of the foldable device is divided into three regions: a primary screen, a back screen, and a secondary screen, and the method comprises:

receiving a first user operation, wherein the first user operation indicates the foldable device to add a custom key on the back screen or the secondary screen;

obtaining a physical state of the foldable device, wherein the physical state comprises a folded state or an unfolded state; and when the foldable device is in the folded state, adding the custom key on the back screen or the secondary screen based on the first user operation.

2. The method according to claim 1, wherein the adding the custom key on the back screen or the secondary screen comprises:

receiving a second user operation, wherein the second user operation is performed at a first position on the back screen or the secondary screen;

adding the custom key at the first position in response to the second user operation;

receiving a second touch operation performed by a user on the primary screen; and establishing a mapping relationship between a first touch operation on the custom key and a second touch event corresponding to the second touch operation based on the second touch operation.

3. The method according to claim 2, the adding the custom key at the first position in response to the second user operation comprises:

displaying a preview key at the first position on the back screen or the secondary screen in response to the second user operation;

receiving a confirmation operation performed by the user; and saving attributes of the custom key in response to the confirmation operation.

4. The method according to claim 3, wherein before the receiving a confirmation operation performed by the user, the method further comprises:

receiving a third user operation performed by the user on the preview key; and changing the attributes of the custom key based on the third user operation.

5. The method according to claim 3, the method further comprises:

when the foldable device is in the folded state, receiving the first touch operation performed by the user on the custom key on the back screen or the secondary screen; and obtaining the second touch event corresponding to the first touch operation, and executing the second touch event.

6. The method according to claim 5, wherein before the obtaining the second touch event corresponding to the first touch operation, and executing the second touch event, the method further comprises:

obtaining the attributes of the custom key; and displaying the custom key on the back screen or the secondary screen based on the attributes.

7. The method according to claim 5, wherein before the receiving the first touch operation on the custom key performed by the user on the back screen or the secondary screen, the method further comprises:

determining the primary screen, the back screen, and the secondary screen of the foldable device.

8. A foldable device, wherein when the foldable device is in a folded state, a touchscreen of the foldable device is divided into three regions: a primary screen, a back screen, and a secondary screen, and the foldable device comprises:

a receiver, configured to receive a first user operation, wherein the first user operation indicates the foldable device to add a custom key on the back screen or the secondary screen; and a processor, configured to obtain a physical state of the foldable device, wherein the physical state comprises a folded state or an unfolded state, and when the foldable device is in the folded state, the processor is further configured to add the custom key on the back screen or the secondary screen based on the first user operation.

9. The foldable device according to claim 8, wherein the processor is further configured to:

receive a second user operation, wherein the second user operation is performed at a first position on the back screen or the secondary screen;

add the custom key at the first position in response to the second user operation;

receive a second touch operation performed by a user on the primary scree; and establish a mapping relationship between a first touch operation on the custom key and a second touch event corresponding to the second touch operation based on the second touch operation.

10. The foldable device according to claim 9, wherein the processor is further configured to:

display a preview key at the first position on the back screen or the secondary screen in response to the second user operation;

receive a confirmation operation performed by the user; and save attributes of the custom key in response to the confirmation operation.

11. The foldable device according to claim 10, wherein the receiver is further configured to receive a third user operation performed by the user on the preview key; and the processor is further configured to change the attributes of the custom key based on the third user operation.

12. The foldable device according to claim 10, wherein the receiver is further configured to: when the foldable device is in the folded state, receive the first touch operation performed by the user on the custom key on the back screen or the secondary screen; and the processor is further configured to obtain the second touch event corresponding to the first touch operation, and execute the second touch event.

13. The foldable device according to claim 12, wherein the foldable device further comprises a display;

the processor is further configured to obtain the attributes of the custom key; and the display is configured to display the custom key on the back screen or the secondary screen based on the attributes.

14. The foldable device according to claim 12, wherein the processor is further configured to:

determine the primary screen, the back screen, and the secondary screen of the foldable device.

15. A non-transitory computer-readable storage medium storing a program or instructions, wherein, when the program or the instructions is/are run on a computer, a foldable device is configured to perform operations comprising:

receiving a first user operation, wherein, when the foldable device is in a folded state, a touchscreen of the foldable device is divided into three regions: a primary screen, a back screen, and a secondary screen, and the first user operation indicates the foldable device to add a custom key on the back screen or the secondary screen;

obtaining a physical state of the foldable device, wherein the physical state comprises a folded state or an unfolded state; and when the foldable device is in the folded state, adding the custom key on the back screen or the secondary screen based on the first user operation.

16. The non-transitory computer-readable storage medium according to claim 15, wherein the adding the custom key on the back screen or the secondary screen comprises:

receiving a second user operation, wherein the second user operation is performed at a first position on the back screen or the secondary screen;

adding the custom key at the first position in response to the second user operation;

receiving a second touch operation performed by a user on the primary screen; and establishing a mapping relationship between a first touch operation on the custom key and a second touch event corresponding to the second touch operation based on the second touch operation.

17. The non-transitory computer-readable storage medium according to claim 16, the adding the custom key at the first position in response to the second user operation comprises:

displaying a preview key at the first position on the back screen or the secondary screen in response to the second user operation;

receiving a confirmation operation performed by the user; and saving attributes of the custom key in response to the confirmation operation.

18. The non-transitory computer-readable storage medium according to claim 17, wherein before the receiving a confirmation operation performed by the user, the operations further comprise:

receiving a third user operation performed by the user on the preview key; and changing the attributes of the custom key based on the third user operation.

* * * * *

UNITED STATES PATENT AND TRADEMARK OFFICE
CERTIFICATE OF CORRECTION

| | | |
|---|---|---|
| PATENT NO. | : 11,899,929 B2 | Page 1 of 1 |
| APPLICATION NO. | : 17/785558 | |
| DATED | : February 13, 2024 | |
| INVENTOR(S) | : Qingfeng Xue et al. | |

It is certified that error appears in the above-identified patent and that said Letters Patent is hereby corrected as shown below:

In the Claims

Column 26, Line 21, change "scree," to --screen--.

Signed and Sealed this
Fifth Day of March, 2024

Katherine Kelly Vidal
*Director of the United States Patent and Trademark Office*